United States Patent [19]

Cameron et al.

[11] Patent Number: 5,245,106
[45] Date of Patent: Sep. 14, 1993

[54] METHOD OF ELIMINATING MERCURY OR ARSENIC FROM A FLUID IN THE PRESENCE OF A MERCURY AND/OR ARSENIC RECOVERY MASS

[75] Inventors: Charles Cameron, Paris; Philippe Courty, Houilles; Jean-Paul Boitiaux, Poissy; Philipe Varin, Massy; Gérard Leger, Ecully, all of France

[73] Assignee: Institut Francais du Petrole, Rueil Malmaison, France

[21] Appl. No.: 785,111

[22] Filed: Oct. 30, 1991

[30] Foreign Application Priority Data

Oct. 30, 1990 [FR] France .................. 90 13599

[51] Int. Cl.$^5$ .................. C07C 7/12; C07C 7/10; C07C 7/148; C07C 7/17
[52] U.S. Cl. .................. 585/823; 585/843; 585/845; 585/848; 585/856; 423/215.5; 502/216; 95/133; 95/134
[58] Field of Search .............. 585/823, 843, 845, 848, 585/856; 423/215.5; 55/74; 502/216

[56] References Cited

U.S. PATENT DOCUMENTS

| | | | |
|---|---|---|---|
| 4,094,777 | 6/1978 | Sugier | 55/59 |
| 4,338,288 | 7/1982 | Rollmann | 423/210 |
| 4,474,896 | 10/1984 | Chao | 502/216 |

FOREIGN PATENT DOCUMENTS 0107582  5/1984  European Pat. Off. .

*Primary Examiner*—Anthony McFarlane
*Assistant Examiner*—Nhat D. Phan
*Attorney, Agent, or Firm*—Millen, White, Zelano & Branigan

[57] ABSTRACT

The invention relates to a method of eliminating mercury or arsenic from a fluid in the presence of a solid mass for the recovery of mercury and/or arsenic. The said mass contains copper and sulphur at least partly in the form of copper sulphide and results (a) from the incorporation of a copper compound other than a sulphide into a solid mineral support, (b) possible calcination of the product obtained in stage (a), and from bringing the product obtained previously into contact with elementary sulphur and (d) a heat treatment.

16 Claims, No Drawings

5,245,106

METHOD OF ELIMINATING MERCURY OR ARSENIC FROM A FLUID IN THE PRESENCE OF A MERCURY AND/OR ARSENIC RECOVERY MASS

BACKGROUND OF THE INVENTION

The present invention relates to a method of elimination from a gaseous or liquid fluid at least one metal or metal compound chosen from the group constituted by mercury and arsenic, by bringing the said fluid into contact with a mercury and/or arsenic recovery mass. The said solid mercury and/or arsenic recovery mass contains a solid mineral dispersant or support, copper and sulphur combined at least partly in the form of copper sulphide and in particular for example in the form of at least one $Cu_xS_y$ sulphide (in which x and y are each a whole number from 1 to 10).

The solid masses of the present invention may be variously called absorption, recovery, extraction or trapping masses.

The patent U.S. Pat. No. 4,094,777 describes a method of producing a mercury recovery mass comprising the incorporation of a copper compound into a mineral support followed by sulphuration at a temperature below 300° C.

Sulphuration according to the method described in this patent is carried out by means of a gaseous agent, for example hydrogen sulphide, or a solution of a mineral sulphide in water or in an organic solvent, for example an aqueous solution of According to patent application EP-A-107582, a mercury recovery mass is prepared by impregnation of a carrier by means of an organic solution of elementary sulphur or an aqueous solution of a sulphur compound which is decomposable into elementary sulphur at a temperature below 150° C.

After drying and volatilisation of the organic compound or after the aforesaid decomposition, a carrier or support is obtained with a dispersion of non-molten sulphur in the free state.

U.S. Pat. No. 4,474,896 described a mercury recovery mass obtained by bringing into contact a carrier impregnated with a metallic cation capable of forming an insoluble polysulphide, with a mixture of polysulphide and sulphide.

SUMMARY OF THE INVENTION

In the tests described, $CaCl_2$ supports treated by elementary sulphur have been prepared. The results obtained in the processing of fluids containing a mercury charge are poor: the effluent displays excessive quantities of mercury.

It has now been discovered by the Applicants that mercury and/or arsenic can be recovered from a gas using a copper sulphide-based solid mass which has a satisfactory level of efficiency and an improved effective life and which costs less to produce, the said mass being obtained by treatment of a support charged with copper oxide with elementary sulphur and then activation.

To be more precise, the method of eliminating mercury or arsenic is characterised in that the solid mercury and/or arsenic recovery mass comprises the following stages:

a) at least one copper compound other than a sulphide is incorporated into a solid mineral dispersant or support, b) on the hypothesis that the said compound is not a copper oxide, the product obtained in stage (a) is calcined to convert the copper compound or compounds which it contains at least partially into copper oxide (CuO and/or $Cu_2O$), c) the product obtained in stage (b) or in stage (a) if there has not been a stage (b) is brought into contact with elementary sulphur, d) the product obtained in stage (c) is subjected to a heat treatment in a non-oxidising atmosphere accompanied by scavenging with gas, at a temperature and for a period which are sufficient to allow the formation of sulphide of the metal or metals present.

The solid mineral dispersants or supports are normally chosen from the group formed by carbon, activated carbon, coke, silica, silicon carbide, silica gel, synthetic or natural silicates, clays, diatomaceous earths, fuller's earths, kaolin, bauxite, inorganic refractory oxides such as for example alumina, titanium oxide, zirconium, magnesium, alimina-silicas, silica-magnesia and silica-zirconia, mixtures of alumina and boron oxide, the aluminates, silico-aluminates, the crystalline, synthetic or natural zeolitic alumino-silicates, for example the mordenites, faujasites, offretites, erionites, ferrierites, zeolites, ZSM5 and ZSM11, the mazzites and the cements such as for example those of the Secar type produced by Messrs. Lafarge.

Preferably, a support is used which is chosen from the group consisting of carbon, activated carbon, coke, silica, the aluminas, the silica-aluminas, the silicates, the aluminates and the cilico-aluminates (zeolitic for example).

Advantageously, the support is chosen from the group consisting of silica, the aluminas, the silica-aluminas, the silicates, the aluminates and the silico-aluminates and quite advantageously alumina is used.

When the mercury and/or arsenic recovery masses are intended for use in the processing of charges containing hydrocarbons which are condensable (for example C4 or higher than C4) at a temperature situated within the range of temperature at which recovery is performed, it has been found that masses having a mean pore diameter at least equal to 100 Angstroms ($10^{-8}$ m) have increased stability.

The conditions of obtaining masses (or supports intended for the production of these masses) having a mean pore diameter of at least 100 Angstroms ($10^{-8}$ m) are sufficiently well known to a man skilled in the art that they do not need to be repeated here, within the framework of the present invention (see for example U.S. Pat. No. 4,094,777).

Usually, the preferred supports have a specific surface area of approx. 20 to 300 $m^2 \times g^{-1}$, these values not being limitative.

The incorporation of a copper compound other than a sulphide into a solid mineral dispersant or support may be carried out by any method known to a man skilled in the art, for example by mixture with a copper compound or by impregnation using a solution of a copper compound. The copper compounds which are normally used are compounds which are readily transformable into copper oxide at relatively low temperatures.

As an example of a copper compound, it is possible by way of non-limitative example to quote: the copper oxides; copper hydroxide $Cu(OH)_2$; the basic copper salts for example the carbonates to formulae $CuCO_3$, $Cu(OH)_2$ and $2CuCO_3$, $Cu(OH)_2$; the salts of these organic complexes of copper such as the salts of carboxylic acids, for example formiates, acetates, tartrates, citrates, benzoates, oxalates, malonates, succinates, glycolates, lactates and acetylacetonate and copper nitrate.

Normally, it si preferable to introduce the copper compound by impregnating the support with an aqueous or organic solution of a copper compound and preferably by means of an aqueous solution of a copper compound. Advantageously, an aqueous solution of copper nitrate is used.

Possibly one can introduce onto the support a small proportion of a soluble silver compound. The quantity of silver introduced into the support expressed by weight of silver in relation to the support normally represents from 0 to 5% by weight. Other metals may likewise be present, for example iron.

The solid mineral dispersant or support comprising a copper compound other than a sulphide is then possibly calcined in order at least partially to convert the copper compound to copper oxide. When in the stage (a) of introduction of a copper compound, a copper oxide is blended with the solid mineral dispersant or support, this calcination stage is not necessary.

During the course of this calcination stage, the working conditions are preferably so chosen that for the most part, that is to say at least 50%, and preferably at least 80% and very advantageously 100% of the copper compound present is converted to copper oxide (CuO). In fact, the Applicants have found that copper is particularly well fixed in the form of copper oxide. Calcination may be conducted in a neutral or in an oxidising atmosphere. Thus it is possible to work in the presence of an inert gas such as nitrogen, argon, helium or a mixture of these gases. It is likewise possible to work in the presence of a mixture of oxygen and inert gas containing for example 1 to 60% by weight of oxygen or even in the presence of substantially pure oxygen.

Calcination is preferably conducted in an oxidising atmosphere and advantageously air is used, but it is likewise possible to use air enriched with oxygen.

The calcination temperature is normally about 200° to about 1000° C. and is preferably about 300° to about 800° C. and even more advantageously 350° to about 600° C.

Calcination may be carried out in a static atmosphere or in a current of gas. Normally, it is preferable to work in a current of gas and advantageously a current of air is used. The spatial velocity per hour (VVH) expressed as a volume of gas per volume of recovery mass and per hour is normally approx. 100 to approx. 20,000 $H^{-1}$ and preferably about 100 to 10,000 $h^{-1}$ and often approx. 300 to 5000 $h^{-1}$.

This calcination stage normally lasts about half an hour to approx. 24 hours and preferably approx. half an hour to approx. 12 hours and even more advantageously from 1 hour to approx. 10 hours.

The product normally containing copper oxide originating from stage (a) or stage (b) of calcination is then brought into the presence of elementary sulphur at least partly in the form of an organic solution or even in the form of solid sulphur or even in the form of vapour, the sulphur condensing on the support during the course of the heat treatment; the product resulting from this incorporation (stage (c)) constitutes the precursor of the mercury recovery mass according to the present invention.

It is in particular possible to use as an organic sulphur solution particles of sulphur in the natent state or in the form of flowers of sulphur, the mean diameter being for example less than 20 microns and preferably comprised between 0.01 and 10 microns in solution at least partly and possibly also in suspension in an organic compound of which the boiling temperature is below 250° C. such as for example: toluene, benzene, methyl alcohol, acetone, carbon disulphide or an other organic compound known to a man skilled in the art in which sulphur is soluble and for example a light fuel boiling at between about 60° and 95° C., a hexane type fuel boiling between approx. 63° and 68° C., a so-called F type fuel boiling between approx. 100° and 160° C. (and containing by volume 10 to 20% of aromatic hydrocarbons) and a white spirit type of fuel boiling between 150° and 250° C. (and containing by volume 14 to 22% aromatic hydrocarbons.

The support is impregnated with the said organic solution, the total quantity of sulphur being introduced in one or possibly several operations of impregnation with intermediate drying at a temperature below 150° C. It is necessary to carry out this or these impregnation(s) while avoiding premature crystallisation of the sulphur on the support, particularly by virtue of there being too great a difference in temperature between the support and the organic impregnation solution. To achieve this objective, it may be advantageous firstly to heat the support to the same temperature as the impregnation solution.

The objective being to convert the copper oxide at least partly into copper sulphide, so reducing the elementary sulphur to $S^{--}$, it has likewise been discovered that this objective can be improved by adding to the said solution at least one reducing compound chosen for example from the group consisting of hydrogen, formaldehyde, acetaldehyde, formic acid, hydrazine etc.

The quantity of sulphur incorporated into the absorption mass is ideally chosen to allow subsequently the conversion of the copper compounds contained in the said mass at least partially into copper sulphide. The quantity of sulphur may easily be adjusted according to the quantity and stoechiometry of copper sulphide which it is desired to obtain.

It is normally desirable to convert all the copper compounds present in the absorption mass into copper sulphide and therefore use a quantity of sulphur calculated, in sulphur atoms, at least stoechiometric, in relation to the copper, or to the combination of copper and other metals present, particularly silver, calculated in atoms of metal and this, for their highest stable valency, for example $Cu^{2+}$, $Fe^{3+}$, $Ag^+$.

Calculated in atoms, the quantity of sulphur used is advantageously such that the atomic ratio of sulphur to active metals present in the mass is approx. 0.8:1 to 2:1 and preferably approx. 0.9:1 to 1.7:1. The term active metals is understood to refer to those which capture mercury and/or arsenic, for example copper, silver, iron. It is likewise possible for example to introduce silver into the said mass particularly by incorporating a silver compound during stage (a) of the process.

The precursor resulting from stage (c) described above is then subjected in stage (d), referred to as the activation stage, to heat treatment in a non-oxidising atmosphere, for example a neutral or reductive and preferably neutral atmosphere, accompanied by a scavenging with gas, at a temperature and for a sufficient time to allow the formation of sulphide of the metal or metals present.

This heat treatment is normally carried out under an inert gas current, for example a current of nitrogen, argon, helium or a mixture of two or more of these gases, or even water vapour in a proportion of less than 10% by volume and preferably less than 5% by volume and very preferably less than 1% by volume. To the said gas can be added 1 to 5% by volume of a reducing compound chosen for example from the group formed by hydrogen, formaldehyde, acetaldehyde, formic acid, hydrogen etc. When water vapour is present, it may be advantageous to add hydrogen for example with a $H_2:H_2O$ ratio greater than 0.1% by volume.

In a preferred form of embodiment of this treatment, the absorption mass containing the sulphur and the copper oxide is treated in a current of inert gas at a temperature of approx. 100° to approx. 250° C. and preferably approx. 120° to 230° C. and often approx. 130° to 220° C. with a spatial hourly velocity (VVH) expressed in terms of volume of gas per volume of recovery mass and per hour, of approx. 100 to 10,000 $h^{-1}$ and preferably approx. 300 to 5000 $h^{-1}$ and often approx. 500 to 2000 $h^{-1}$. The period of this treatment accompanied by gas scavenging is normally approx. half an hour to approx. 24 hours and is preferably approx. half an hour to about 10 hours, a period of approx. 2 hours being normally sufficient.

During the course of the heat treatment, there is a chemical interaction between the copper oxide, possibly promoted by Ag, Fe and sulphur. A release of $SO_2$ is observed according to a possible reaction:

$$2 CuO + 3 S \rightarrow 2 CuS + SO_2$$

When at least one reducing agent has been added to the sulphur during state (c) the proportion of sulphur eliminated in the form of $SO_2$ may preferably be reduced as follows:

$$CuO + HCHO + S \rightarrow CuS + HCOOH$$

or even $$CuO + HCOOH + S \rightarrow CuS + CO_2 + H_2O$$

After the heat treatment (stage d) accompanied by gas scavenging, the absorption mass may possibly be dried, preferably in a current of inert gas, for example in a current of nitrogen, helium, argon or a mixture of two or more of these gases (in the presence or absence of a reducing compound such as that previously described) and then possibly cooled down to ambient temperature, preferably in the presence of the aforesaid current of gas, before being brought into contact with the fluid to be purified.

In another embodiment of the invention which does not constitute a preferred embodiment, it is finally possible to incorporate a stage (b') of reducing treatment following stage (b), in the vent of the copper having been deposed by impregnation or at the end of stage (a) if a copper oxide has been added by wet mixture with a support (no calcination).

The reducing treatment then seeks to convert the copper oxide, possibly promoted by the silver or even by the iron, to metallic copper. Any industrial process known to a man skilled in the art may be utilised, for example in the presence of a gas containing hydrogen or even reduction in the presence of a chemical reducing compound such as for example aldehydes (for example formaldehyde, acetaldehyde), hydrogen (formic acid), as indicated hereinabove as an improvement to stage (c).

After reduction by at least 50% and preferably 70% and even more preferably 85% of the copper oxide to metal copper, and possibly the metal silver (iron if this is present being only partially reduced), the product obtained is brought into contact with elementary sulphur for example possibly at least partially in the form of an organic solution or without a solvent (stage (c)) after which it is dried and activated according to stage (d).

During the course of this stage, the sulphide forms then stoechiometrically for the metallic copper fraction:

$$Cu + S \rightarrow CuS.$$

And as hereinabove for the fraction of copper in the oxide form:

$$2 CuO + 3 S \rightarrow 2 CuS + SO_2$$

The recovery mass obtained at the end of stage (d) contains 8 to 25% by weight of copper sulphide and preferably approx. 10 to 20% and in an often advantageous form 12 to 18%. Usually, masses are preferred which have at least 60% and preferably at least 80% copper (by weight) in the sulphide state.

Structural analysis shows that the sulphide is at least partly in the form of CuS and generally the greater part of the sulphide is in this form. Other sulphides may be present which have as their formula $C_xS_y$ in which s, y represent a whole number between 1 and 10.

The mercury and/or arsenic recovery masses obtained by the method according to the present invention may be used for purifying gases or even liquids which contain mercury and/or arsenic, for example gas condensates. These solid masses are usually employed in the form of a fixed bed through which the fluid to be purified is passed.

The range of temperature in which the recovery masses are effective is normally comprised between approx. $-50°$ C. and $+200°$ c. Mercury and/or arsenic may be recovered at atmospheric pressure or at a lower or higher pressure, the total pressure possibly being as much as 10 MPa. The VVH (volume of charge per volume of recovery mass and per hour) for the gaseous charges is usually about 500 to 50,000 $h^{-1}$, but it is preferably to work with a VVH of approx. 2000 to 20,000 $h^{-1}$ and advantageously approx. 4000 to 15,000 $h^{-1}$; for liquid charges, the VVH will preferably be approx. 0.1 to 20 $h^{-1}$.

The fluids treated by means of the recovery masses prepared as described hereinabove may contain for example 10 nanograms to 2 grams of mercury or more per cubic meter. The gases treated are more often than not hydrocarbons or mixtures of hydrocarbons such as for example the natural gases which contain a major proportion of methane and a lesser proportion of hydrocarbons containing $C_2$ and/or higher hydrocarbons and mercury. The gases treated often contain gases other than hydrocarbons such as $CO_2$, water and $H_2S$, in variable quantities.

The gas treated may also be hydrogen, such as for example electrolytic hydrogen; it may also be air provided that the working conditions in terms of temperature and/or pressure are such that contact with the gas does not produce oxidation of the absorption mass or of an excessive part of the said mass. It is also possible to envisage the treatment of mixtures containing a plurality of the aforesaid compounds or gases.

More often than not, the liquids treated are mixtures of hydrocarbons normally containing a major proportion of saturated hydrocarbons containing 4 to 50 carbon atoms in their molecule, for example gas condensates, having mercury and/or arsenic.

Any apparatus know to a man skilled in the art and currently used for the purification of fluid may be used. The mercury elimination apparatus may for example consist of a single reactor or at least two reactors in parallel but preferably at least two reactors will be used in series.

If one considers the case of three reactors A, B and C in series, it is preferable to work as follows: when the first reactor A has reached a recovery efficiency which is no longer for instance 90% or 70% of its initial efficiency, the recovery mass contained in A will be regenerated or replaced. During the time needed for this regeneration or replacement stage, the fluid will pass into reactors B and C; after the regeneration or replacement of A, the fluid will pass into B and C and then into A; B will then be regenerated or replaced when its efficiency is no longer more than for instance 90% or 70% of its initial efficiency; during this time, the fluid will pass over C and A. After regeneration or replacement of B the fluid will pass into C, A and then B. Then C will be regenerated or replaced and so on.

Regeneration can be carried out either in the reactor or in a unit provided for the purpose once the recovery mass has been discharged.

Regeneration is carried out by heating under conditions which make it possible to eliminate the mercury and/or the arsenic, accompanied by gas scavenging, preferably using an oxidising gas such as for example air, preferably over 0.1 to 48 hours, at a temperature of 200° to 800° C.; this stage is preferably followed by resulphuration (stages c and d).

The following examples illustrate but in no way limit the scope of the invention.

EXAMPLE 1 (comparative)

1 kg autoclaved alumina balls of 170 $m^2 \times g^{-1}$ specific surface area and with a poor volume of 1.2 $cc \times g^{-1}$ is impregnated with 1.2 l of an aqueous solution containing 370 g trihydrated copper nitrate $Cu(NO_3)_2, 3H_2O$.

The alumina balls thus impregnated are dried and calcined for 7 hours at 400° C. in a current of air with a VVH of 5000 $h^{-1}$. So-called basic balls are obtained for the experiment to be continued. The resultant balls are in another stage not in accordance with the invention impregnated with a dredger using 1 l containing 0.52 l of water and 0.48 l of a 20% aqueous solution of ammonium sulphide, the percentage being by weight. The excess sulphur is eliminated by drying in an oven at 200° C. for 10 hours in a current of nitrogen (VVH 5000 $h^{-1}$).

The mass A obtained contains copper sulphide in a quantity of 15% in relation to the weight of the mass. Analysis by X-ray defraction indicates that all the copper is in the form of copper sulphide. Chemical analysis shows that the atomic ratio of Cu:S is equal to 1.

EXAMPLE 2

Exactly as in the previous example, 1 kg of autoclaved alumina balls 170 $m^2 \times g^{-1}$ of specific surface area and with a pore volume of 1.2 $cc \times g^{-1}$ is impregnated with 1.2 l of an aqueous solution containing 300 g trihydrated copper nitrate. The alumina balls thus impregnated are dried and calcined for 7 hours at 400° C. in a current of air at a VVH of 5000 $h^{-1}$.

Then, the procedure according to the invention is performed: the balls thus obtained (and referred to as basic) are preheated to 70° C. and then in another stage, corresponding to stage (c) of the invention) they are impregnated with a dredger using an organic mixture of sulphur containing 90 g micronised sulphur the particles of which have a mean diameter of 2 microns, partially solubilised in 1.1 l of toluene at 70° C., impregnation being carried out in one single operation, under heat on the support which is preheated to 70° C.

The product is then dried at 120° C. to eliminate the major part of the solvent (which is condensed and then recycled). And then at 200° C. (heat treatment of stage (b) of the invention) for 10 hours in a current of nitrogen. It is observed that $SO_2$ is released.

The mass B obtained contains 15% copper sulphide, as the mass A. Analysis by X-ray defraction shows that all the copper is combined in the form of copper sulphide CuS. Chemical analysis shows that the atomic ratio of Cu:S is equal to 1.

EXAMPLE 3

The way the mercury recovery mass is prepared is exactly as in the second example, the aqueous solution containing 370 g trihydrated copper nitrate being replaced by 365.3 g trihydrated copper nitrate and 3.36 g silver nitrate.

The mass C obtained contains 15% copper sulphide plus silver sulphide as the masses A and B previously described. X-ray defraction analysis shows that all the copper and all the silver in the mass C are in the form of a sulphide.

EXAMPLE 4

The mercury and/or arsenic recovery masses A, B and C obtained in the preceding examples are tested under the following conditions. The apparatus consists of a tubular metal reactor of which the inactivity for fixing mercury has been monitored. Into this reactor are introduced 30 ml of the recovery mass to be tested and a stream of natural gas containing mercury is passed through at a temperature of 50° C. at a pressure of 40 bars (4 MPa) at a VVH of 15,000 $h^{-1}$ (TPN, temperature and pressure normal), in other words at a rate of flow of 450 $l \times h^{-1}$.

The centesimal volumetric composition of the natural gas to be cleansed is 84% $CH_4$, 0.6% hydrocarbons having 5 and more carbon atoms in their molecule, the balance consisting of a mixture $N_2$, $CO_2$, $C_2H_4$, $C_3H_8$ and $C_4H_{10}$. The mercury content in the gas at the intake to the reactor is 4500 $g/Nm_3$ (TPN).

The quantity of mercury remaining in the gases after purification is assessed by a method which employs the principle of the variation in resistivity of a gold foil amalgamated by mercury.

The efficiency of the recovery masses is defined by the following equation.

$$E\% = \frac{\text{(mercury content at intake)} - \text{(mercury content of outlet)} \times 100}{\text{(mercury content at intake)}}$$

The so-called "initial" efficiency is determined after 10 hours operation under the above-mentioned conditions.

Measurements are then taken at the end of 500, 1000 and 1500 hours' operation under the above-described working conditions.

The results are set out in Table I hereinafter: they show that the masses obtained by the method according to the present invention are very effective and moreover that their long-term life is greater than that of the comparison mass A.

EXAMPLE 5

The starting product for the following tests are so-called basic balls prepared in Examples 1, 2 and 3.

All tests were conducted on a basis of these balls.

It will be recalled that the method developed according to the invention embodies a plurality of alternatives, the basic pattern being as follows:

Mixture of the support charged with copper oxide (that is to say the so-called basic balls) with elementary sulphur in powder or granule form.

Heat treatment of the mixture at between 140° C. and 150° C. in an inert atmosphere, for example water vapour or nitrogen.

Possible additional treatment by impregnation of the resultant product with dilute formic acid.

Possibly a final heat treatment (between 140 and 150° C.) in an inert atmosphere of nitrogen or water vapour.

Note:
a) When two final stages are carried out before the two first stages, substantially the same results are obtained.

b) Also, similar results are obtained by simultaneously performing certain stages and particularly by keeping to the following pattern:

Mixture of the support charged with copper oxide (that is to say the so-called basic balls) with elementary sulphur and simultaneous impregnation with dilute formic acid.

Heat treatment of the resultant mixture at 140° to 150° C. in an inert gas, particularly nitrogen.

c) Also, results of the same magnitude are obtained by the following method:

The support charged with copper oxide is treated with a reducing agent.

The support obtained and charged with copper is treated with elementary sulphur.

Heat treatment under an inert gas, particularly nitrogen, at between 200 and 220° C.

Heat treatment at a temperature greater than 200° C. makes it possible to eliminate the melting loss at 200° C. so that all the copper is converted to copper sulphide.

Two industrial tests were also carried out:

Charged with copper oxide, the support (so-called basic balls) is carefully mixed with elementary sulphur having a granulometry of between 0.5 and 1 mm, originating from the Industrial Sulphur Company.

The mixture thus obtained is treated in a rotary steamer for two hours in a nitrogen atmosphere (industrial test $N_2$) while a second test was performed under water vapour (industrial test H20) under the above working conditions.

Table II hereinafter summarises all the results.

TABLE II

TABLE OF RESULTS
PROCESSES

|  | Comparative catalyst treated by $(NH_4)2S—N_2$ | Comparative catalyst treated by $(NH_4)2S—H_2O$ | $N_2$ (140–150) | $H_2O$ (140–150) | Indust. $H_2O$ (140–150) | Indust. $N_2$ | $N_2$ (220) |
|---|---|---|---|---|---|---|---|
| Total S (% wt) | 6.62 | 6.4 | 8.7 | 5.8 | 6.2 | 7.2 | 5.3 |
| S as sulphides $S^{2-}$ (% wt) | 5.71 | 4.86 | 6.2 | 3.2 | 3 | 6 | 5.02 |
| S as sulphate $SO_4^{2-}$ (% wt) | 0.005–0.2 | 0.6–0.5 | 0.85–0.6 | 1.26 | 1.86 | 0.5 | 0.2 |
| Melting losses ML under $N_2$ at 200° C. (% wt) | 1.51 | 3.15 | 0.5 | 2.8 | 3 | 1 | 0 |
| (1) | CuS | CuS | CuS + CuO | CuS + CuO | CuS + CuO | CuS + CuO | CuS |

Note:
(1) Presence of CuS and/or CuO - analysis by X-ray defraction.

EXAMPLE 6

Analyses by X-ray defraction show that the copper oxide is not entirely converted to copper sulphide during heat treatment at 140°–150° C. Only half the oxide was converted.

A. To complete this conversion, the following test was conducted:

1) The catalyst obtained after mixture with sulphur and heat treatment under nitrogen (or water vapour) was impregnated with a mixture containing 15% formic acid. All the pore volume, in other words approx. 60 cc per 100 g of catalyst, was impregnated.

2) The catalyst thus impregnated was treated at 140°–150°C. under nitrogen (or water vapour).

The results by X-ray defraction analysis are conclusive: all the copper oxide was converted to copper sulphide.

TABLE I

|  | mass A | | mass B | | mass C | |
|---|---|---|---|---|---|---|
|  | residual mercury g/Na³ | efficacy % | residual mercury g/Na³ | efficacy % | residual mercury g/Na³ | efficacy % |
| Time: | | | | | | |
| 10 h | 1 | 99.98 | 0.6 | 99.987 | 0.4 | 99.991 |
| 500 h | 0.8 | 99.982 | 0.3 | 99.993 | 0.3 | 99.993 |
| 1000 h | 1 | 99.978 | 0.4 | 99.991 | 0.2 | 99.996 |
| 1500 h | 1.2 | 99.973 | 0.5 | 99.988 | 0.2 | 99.996 |

B. This treatment was applied on an industrial scale under the following conditions:

The catalyst was impregnated to 20% of its pore volume with a solution of 20% formic acid, in other words 120 l of dilute formic acid per tonne of catalyst.

The catalyst was then treated under nitrogen (or water vapour) at 140°-150° C. in a Louisville type furnace.

The results are identical to those obtained under laboratory conditions.

EXAMPLE 7

The following tests were then conducted (in the laboratory):

- impregnation of the support charged with copper oxide (so-called basic balls) by a solution of dilute formic acid. The quantity of formic acid used is the stoechiometric quantity;
- treatment at 140°-150° C. under nitrogen or water vapour;
- mixture of the resultant product containing metallic copper with elementary sulphur;
- heat treatment at 140°-150° C. under nitrogen or water vapour.

The results are identical to the preceding tests, that is to say the initial copper oxide is entirely converted to copper sulphide.

EXAMPLE 8

As described in Example 4, the apparatus consists of a tubular metal reactor of which the inactivity for fixing arsenic has been monitored. 100 ml of the recovery mass to be tested are introduced into this reactor and a current of natural gas is passed which contains arsenic at a temperature of 60° C. and at a pressure of 35 bars (3.5 MPa).

Two recovery masses were tested: the mass dried under nitrogen at a temperature between 140°-150° C. was tested at a VVH of 1015 h$^{-1}$ and the industrially produced mass dried under nitrogen at a temperature between 140°-150° C. was tested at a VVH of 3045 h$^{-1}$.

In both cases, the bed of recovery mass was separated into five 12 g zones. The zone referred to as "zone 1" is the first to contact the charge containing the arsenic.

The centesimal volumetric composition of the natural gas to be purified is 84% $CH_4$, 0.6% hydrocarbons containing 5 carbon atoms and more in their molecule, the balance consisting of a mixture of $N_2$, $CO_2$, $C_2H_4$, $C_3H_8$ and $C_4H_{10}$. The quantity of arsenic in the gas at the entrance to the reactor is $1.607 \times 10^{-4}$ g per hour in both cases.

The quantity of arsenic remaining in the gases after purification is evaluated by establishing the difference between the quantity of arsenic in the charge (known) and the total quantity of arsenic detected in the recovery mass after tests by X-ray fluorescence measurement.

The efficiency of the recovery masses is defined by the equation $$E \% = 100 - \frac{\text{(weight of As at entrance)} - \text{weight of As in the mass)} \times 100}{\text{(weight of As at the entrance)}}$$

The results are given in the following table; they show that using the masses obtained by the method according to the invention is a highly efficient measure.

|  | Mass $N_2$ (140-150) | Mass Indust.$N_2$ (140-150) |
|---|---|---|
| Zone 1 (ppm As) | 6290 | 4770 |
| Zone 2 (ppm As) | 490 | 2095 |
| Zone 3 (ppm As) | <30 | 110 |
| Zone 4 (ppm As) | <30 | <30 |
| Zone 5 (ppm As) | <30 | <30 |
| Total (ppm As) | 6780 | 6975 |
| Total (g As) | $8.136 \times 10^{-2}$ | $8.370 \times 10^{-2}$ |
| Duration of test (h) | 507.25 | 528 |
| Total As at entrance (g) | $8.152 \times 10^{-2}$ | $8.485 \times 10^{-2}$ |
| E % | >99.8 | >98.6 |

The method of preparing the mercury and/or recovery mass for the subsequent use of this mass in a method of eliminating mercury and/or arsenic makes it possible to obtain a solid mass having better long-term resistance and also the following main advantages:

- Possibility of incorporating the sulphuration agent at a relatively low temperature, usually below 100° C.
- Possiblity of converting the precursor of the mercury and/or arsenic recovery mass resulting from the incorporation of the elementary sulphur, in an active recovery mass, at a relatively low temperature, usually below 250° C.
- Use of a non-toxic sulphuration agent which has not unpleasant smell.

We claim:

1. A method of eliminating from a fluid at least one metal or metal compound selected from the group consisting of mercury and arsenic, comprising contacting said fluid with a solid mercury and/or arsenic recovery mass consisting essentially of a solid mineral dispersant or support containing copper sulfide, said mass having been produced by the following process:
   (a) providing a solid mineral dispersant or support having incorporated therein copper oxide,
   (b) contacting said solid mineral dispersant or support with elementary sulfur, and
   (c) heating resultant product obtained in stage (b) in a non-oxidizing atmosphere at a temperature and for a period sufficient to form at least copper sulfide.

2. A method according to claim 1, in which said fluid is a gas or a liquid.

3. A method according to claim 1 in which said mass is incorporated in a fixed bed.

4. A method according to claim 1 in which said fluid is a natural gas consisting essentially of methane and saturated hydrocarbons higher than methane.

5. A method according to claim 1, in which said fluid is a hydrocarbon or a mixture of hydrocarbons.

6. A method to claim 1 in which said fluid is a gas condensate.

7. A method to claim 1 in which the mass comprises a proportion of copper sulfide representing about 8 to 25% by weight of the weight of the said mass and in which the atomic ratio of S:Cu is between 0.8:1 and 2:1.

8. A method according to claim 1, in which during the course of stage (b), at least some of the elementary sulfur is used in solution in an organic solvent.

9. A method according to claim 1 in which in stage (c) at least 50% of copper is combined in the form of copper sulfide $Cu_xS_y$ in which x and y are each a whole number from 1 to 10.

10. A method according to claim 1, in which in stage (b), the product from stage (a) is impregnated with an organic solution of sulfur or with sulfur in the liquid state or with sulfur in the vapor state which is condensed on the support.

11. A method according to claim 1, wherein said solid mineral dispersant or support in stage (a) additionally contains a silver compound.

12. A method according to claim 1, further comprising subjecting the copper oxide to a reduction stage to form metallic copper prior to stage (b).

13. A method according to claim 12, in which the reduction stage is carried out with a compound chosen from the group consisting of hydrogen, an aldehyde, formic acid and hydrazine.

14. A method according to claim 12, said solid mineral dispersant or support in stage (a) having additionally incorporated therein a silver compound.

15. A method according to claim 1, wherein prior to stage (a), a copper compound other than copper oxide is incorporated in said solid mineral dispersant or support, and the resultant product is calcined in order to provide said solid mineral dispersant or support having incorporated therein copper oxide.

16. A method according to claim 15, in which an aqueous copper nitrate solution is used to impregnate the solid mineral dispersant or support prior to said calcining.

* * * * *